(12) United States Patent
Sato

(10) Patent No.: US 11,231,051 B2
(45) Date of Patent: Jan. 25, 2022

(54) BLOWER AND AIR CONDITIONER HAVING THE SAME

(71) Applicant: Samsung Electronics Co., Ltd., Suwon-si (KR)

(72) Inventor: Seiji Sato, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 16/728,214

(22) Filed: Dec. 27, 2019

(65) Prior Publication Data

US 2020/0212656 A1 Jul. 2, 2020

(30) Foreign Application Priority Data

Dec. 27, 2018 (JP) ............................. JP2018-245244
Jun. 28, 2019 (JP) ............................. JP2019-121379
Dec. 2, 2019 (KR) ........................ 10-2019-0158196

(51) Int. Cl.
*F04D 33/00* (2006.01)

(52) U.S. Cl.
CPC .................................. *F04D 33/00* (2013.01)

(58) Field of Classification Search
CPC .......... F04D 19/02; F04D 25/06; F04D 25/08; F04D 33/00; F15D 1/0075; H05H 1/54; F24F 7/007
USPC .............................................. 417/48; 62/180
See application file for complete search history.

(56) References Cited

U.S. PATENT DOCUMENTS

| 2,279,586 | A | | 4/1942 | Bennett | |
| 3,138,919 | A | * | 6/1964 | Deutsch | F03H 1/00 60/202 |
| 3,151,259 | A | * | 9/1964 | Gloersen | H05H 1/54 310/11 |
| 3,277,631 | A | * | 10/1966 | Sunnen | H01J 49/26 95/28 |

(Continued)

FOREIGN PATENT DOCUMENTS

| EP | 2365219 A2 | 9/2011 |
| EP | 2635095 A1 | 9/2013 |

(Continued)

OTHER PUBLICATIONS

International Search Report dated Apr. 27, 2020 in connection with International Patent Application No. PCT/KR2019/018337, 3 pages.

(Continued)

*Primary Examiner* — Alexander B Comley

(57) ABSTRACT

A blower including a duct configured to allow air to flow in and out and a plurality of blades disposed to be parallel to the duct. Each of the blades including a first part, a second part, and an airflow generator configured to generate airflow in a direction from the inlet to the outlet by applying a voltage between the first electrode and the second electrode which are disposed between a first electrode on a side of the inlet, a second electrode on a side of the outlet, and a dielectric. In a cross section of the blade in the airflow direction when cut in a cross section perpendicular to each of the blades, the first part has a thickness decreasing in a direction toward the inlet and the second part has a thickness decreasing in a direction toward the outlet.

17 Claims, 15 Drawing Sheets

(56) References Cited

U.S. PATENT DOCUMENTS

| | | | | |
|---|---|---|---|---|
| 5,803,709 | A * | 9/1998 | Matthews | F04D 29/545 415/182.1 |
| 6,603,268 | B2 * | 8/2003 | Lee | A61L 9/22 315/111.01 |
| 6,719,535 | B2 * | 4/2004 | Rakestraw | F04B 17/00 417/48 |
| 7,316,543 | B2 * | 1/2008 | Goodson | F04B 17/00 204/454 |
| 8,172,547 | B2 | 5/2012 | Dyer et al. | |
| 2004/0202547 | A1 * | 10/2004 | Taylor | F24F 8/192 417/48 |
| 2005/0051420 | A1 | 3/2005 | Botvinnik et al. | |
| 2009/0196765 | A1 * | 8/2009 | Dyer | H05H 1/2406 417/48 |
| 2010/0116469 | A1 * | 5/2010 | Jewell-Larsen | F04B 19/006 165/104.34 |
| 2010/0254800 | A1 * | 10/2010 | Fitton | F04D 33/00 415/90 |
| 2010/0329838 | A1 | 12/2010 | Greenblatt | |
| 2011/0180149 | A1 | 7/2011 | Fine et al. | |
| 2012/0307440 | A1 * | 12/2012 | Franz | G06F 1/20 361/679.5 |
| 2013/0209294 | A1 * | 8/2013 | Iwamoto | F04D 25/0613 417/423.14 |
| 2013/0340981 | A1 * | 12/2013 | Jewell-Larsen | F24F 7/007 165/120 |
| 2014/0234130 | A1 * | 8/2014 | Yamaoka | F04D 25/08 417/234 |
| 2016/0281739 | A1 * | 9/2016 | Nakagawa | F24F 1/40 |
| 2017/0152854 | A1 * | 6/2017 | Gebert | F04D 25/064 |
| 2018/0335055 | A1 * | 11/2018 | Goto | F04D 29/526 |

FOREIGN PATENT DOCUMENTS

| | | |
|---|---|---|
| JP | 2007317656 A | 12/2007 |
| JP | 2008-291798 A | 12/2008 |
| JP | 2011-231928 A | 11/2011 |
| JP | 2011231928 A * | 11/2011 |
| JP | 5004079 B2 | 8/2012 |
| JP | 5060163 B2 | 10/2012 |
| JP | 5453365 B2 | 3/2014 |
| JP | 2017091618 A | 5/2017 |
| JP | 2017193965 A | 10/2017 |
| JP | 2018159379 A | 10/2018 |

OTHER PUBLICATIONS

Supplementary European Search Report dated Oct. 28, 2021 in connection with European Application No. 19903157.6, 7 pages.

* cited by examiner

BLOWER AND AIR CONDITIONER HAVING THE SAME

CROSS-REFERENCE TO RELATED APPLICATIONS

This application claims the benefit of Japan Patent Application Nos. 2018-245244, filed on Dec. 27, 2018 and 2019-121379, filed on Jun. 28, 2019 in the Japan Patent Office, and Korean Patent Application No. 10-2019-0158196, filed on Dec. 2, 2019 in the Korean Intellectual Property Office, the disclosures of which are incorporated herein by reference.

BACKGROUND

1. Field

Embodiments of the present disclosure relate to a blower and an air conditioner having the same, and particularly, to a blower configured to generate airflow using a plasma actuator and an air conditioner having the same.

2. Description of the Related Art

Gas treatment devices using a plurality of airflow generating devices disposed in a stacked manner with a regular interval therebetween to generate airflow in a radical generator in one direction are known (for example, Patent Document 1).

RELATED ART DOCUMENTS

Patent Document

Japanese Patent Application Laid-Open No. 2007-317656

SUMMARY

Therefore, it is an aspect of the present disclosure to provide a blower. It is difficult for a blower structure in which a plurality of airflow generators are disposed in a stacked manner to decrease entry loss of airflow, suppress separation of outlet flow, and increase static pressure due to an increase in width of a flow path.

Additional aspects of the disclosure will be set forth in part in the description which follows and, in part, will be obvious from the description or may be learned by practice of the disclosure.

In accordance with one aspect of the present disclosure, a blower includes a duct including an inlet and an outlet, and a plurality of blades arranged in the duct to be spaced a regular distance from each other in a vertical direction, wherein each of the plurality of blades includes a first part having a thickness decreasing in a direction toward the inlet, a second part having a thickness decreasing in a direction toward the outlet, a third part formed between the first part and the second part and having a uniform thickness, and an airflow generator having a first electrode, a second electrode, and a dielectric and disposed on the third part to generate airflow in a direction from the inlet to the outlet when a voltage is applied between the first electrode and the second electrode.

Each of the plurality of blades may further include a catalyst applied to one surface of the second part to adsorb and decompose ozone.

An upstream side of the first part may have a round or sharp shape.

A downstream side of the second part may have a round or sharp shape.

The airflow generator may be disposed on one surface of the third part, and a direction of airflow formed by the airflow generator may be parallel to the plurality of blades.

Each of the plurality of blades may include a plurality of airflow generators, and the plurality of airflow generators may be disposed on one surface and the other surface of the third part.

The plurality of blades may include catalysts applied to one surface and the other surface of the second part to adsorb and decompose ozone.

The duct may include an inlet part formed to be in contact with the inlet to guide air suctioned through the inlet, and the inlet part may have a cross-sectional area increasing in a direction toward the inlet.

The duct may include an outlet part formed to be in contact with the outlet to guide the airflow to the outlet, and the outlet part may have a cross-sectional area increasing in a direction toward the outlet.

The duct may include a catalyst applied to an inner surface of the duct that is closer to the outlet than the airflow generator so as to adsorb and decompose ozone.

The plurality of blades may be arranged in parallel in a vertical direction.

The plurality of blades may be arranged in a zigzag form in a vertical direction.

The plurality of blades may include a first blade and a second blade disposed downstream from the first blade, and the first electrode of the second blade may face the third part of the first blade.

A length of an airflow direction of the first electrode may be shorter than a length of an airflow direction of the second electrode.

The first electrode may include an electrode-front surface on an upstream side and an electrode-rear surface on a downstream side, and the electrode-rear surface may be inclined toward the second electrode.

In accordance with another aspect of the present disclosure, an air conditioner includes a heat exchanger and a blower configured to blow air to exchange heat through the heat exchanger, wherein the blower may include a duct including an inlet and an outlet and a plurality of blades arranged in the duct to be spaced a regular distance from each other in a vertical direction, each of the plurality of blades may include an airflow generator including a first electrode on a side of the inlet, a second electrode on a side of the outlet, and a dielectric provided between the first electrode and the second electrode and configured to apply a voltage between the first electrode and the second electrode to generate airflow in a direction from the inlet to the outlet, and each of the plurality of blades may include a first part and a second part which are parallel to a direction of the airflow, wherein, in a cross section of the blade in an airflow direction when cut in a cross section perpendicular to each of the blades, the first part has a thickness decreasing in a direction toward the inlet and the second part has a thickness decreasing in a direction toward the outlet.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings.

Background and Overview of Embodiments

Air conditioners include a heat exchanger body and a blower for ventilation of the heat exchanger body. The air conditioners may further include an air cleaning filter. To achieve the high performance of the air conditioner, it is important to perform ventilation at a more uniform blowing speed distribution so as to achieve the high performance of the air conditioner, and the development of a blower or a flow path is required for the same.

As the blower for ventilation of the air conditioner, a propeller fan, a Sirocco fan, and the like are generally used. In this case, to provide the air conditioner with blowing speed distribution which is as uniform as possible, a fan is required to be spaced a distance from a unit. However, since a sufficient distance due to limit of a size of a product cannot be secured, it is difficult to provide uniform blowing speed distribution. Therefore, it is difficult to achieve compactness and high performance of products.

Under this circumstance, a plurality of airflow generators, so called plasma actuators, that generate an airflow by applying a voltage between two electrodes so that discharge is performed are disposed in parallel, and thus the airflow generators may be disposed closer to the heat exchanger than the fan. However, when compared with blowing by the fan, an increase in static pressure is small, d sufficient performance for resistance of the heat exchanger cannot be secured.

Therefore, in the embodiments, a cross section of a leading edge part of each of a plurality of blades has a round shape or a sharp shape, a cross section of a trailing edge part thereof has a shape in which a thickness gradually decreases in a direction toward a trailing edge, and an airflow generator is disposed in a portion having a uniform thickness between the leading edge part and the trailing edge part.

Figure 1:
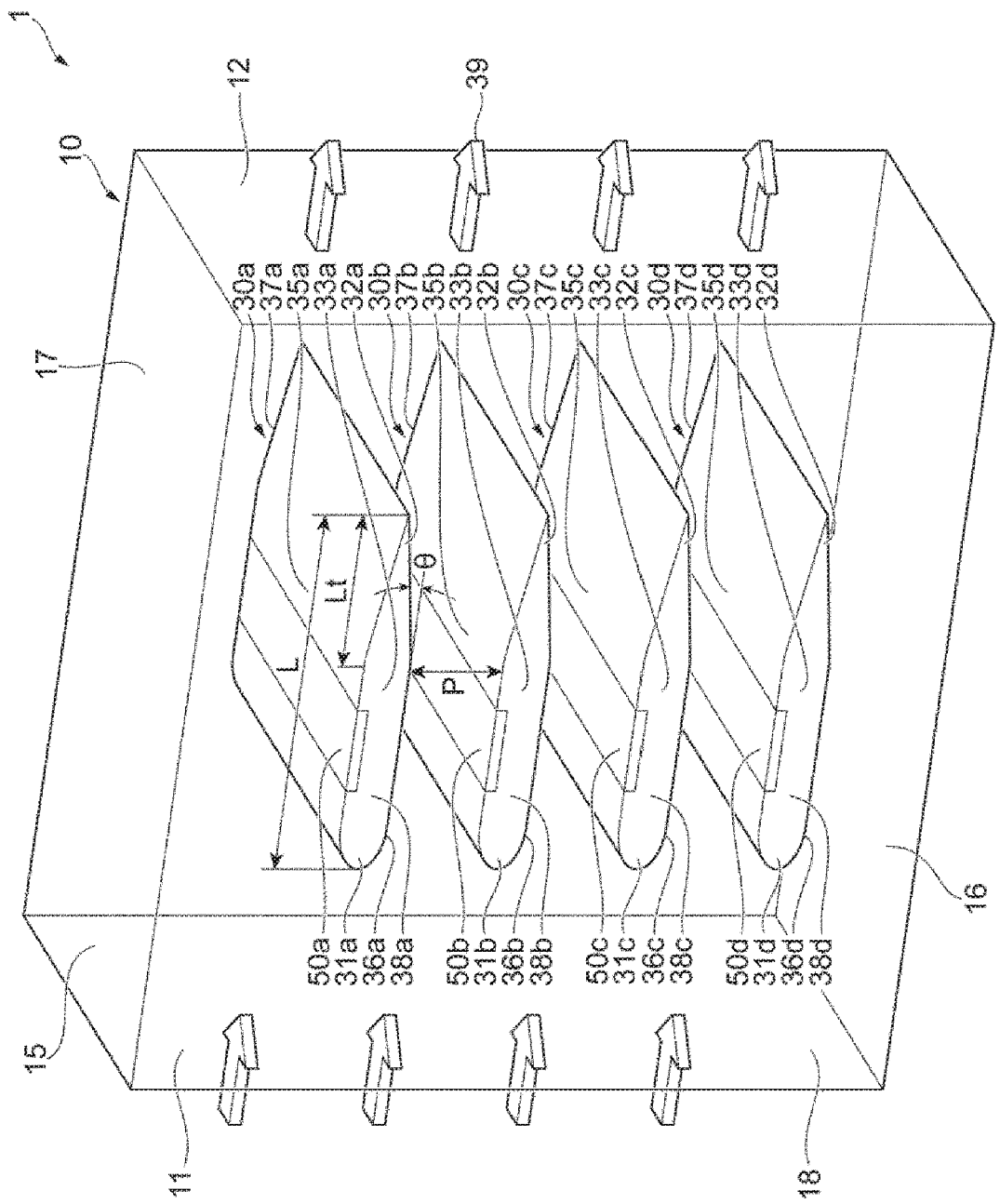
FIG. 1 is a view illustrating a configuration example of an entirety of a blower according to a first embodiment of the present disclosure.

FIG. 1 is a view illustrating a configuration example of an entirety of a blower 1 according to a first embodiment. As shown, the blower 1 according to the first embodiment includes a duct 10 and flat blades 30a to 30d.

The duct 10 includes an inlet 11, an outlet 12, an upper surface 15, a lower surface 16, a first lateral surface 17, and a second lateral surface 18.

The inlet 11 refers to an air inlet to the duct 10, and the outlet 12 refers to an air outlet from the duct 10. That is, the duct 10 functions as a flow path of air from the inlet 11 to the outlet 12. Hereinafter, a side of the inlet 11 refers to an upstream side, and a side of the outlet 12 refers to a downstream side.

An upper surface 15 refers to a surface that covers an upper portion of the duct 10, a lower surface 16 refers to a surface that covers a lower portion of the duct 10, a first lateral surface 17 refers to a surface that covers a left portion of the duct 10 when viewed from the upstream side of the duct 10, and a second lateral surface 18 refers to a surface that covers a right portion of the duct 10 when viewed from the upstream side thereof. The upper surface 15, the lower surface 16, the first lateral surface 17, and the second lateral surface 18 are formed as flat surfaces. That is, the duct 10 has a rectangular parallelepiped shape having an open upstream side and an open downstream side.

The flat blades 30a to 30d refer to four flat blades disposed in the duct 10 to be nearly parallel to each other. The flat blades 30a to 30d have uniform cross-sectional shapes in a width direction (a direction in which the first lateral surface 17 is connected to the second lateral surface 18). In the drawings, the flat blades 30a to 30d are shown, and added letters such as a to d are added to symbols of components of the flat blades 30a to 30d, respectively. However, when it is necessary to distinguish the components of the flat blades 30a to 30d, for example, the flat blade 30 may be described without the added letters. Further, the four flat blades 30 are shown in the drawing, but two, three, or five or more flat blades 30 may be disposed.

The flat blade 30 includes a leading edge part 31, a trailing edge part 32, a middle part 33, an upper surface 35, a lower surface 36, a first lateral surface 37, and a second lateral surface 38. The leading edge part 31 refers to n edge of the upstream side of the flat blades 30, the trailing edge part 32 refers to an edge of the downstream side of the flat blades 30, and the middle part 33 refers to a portion between the leading edge part 31 and the trailing edge part 32. In the embodiment, the leading edge part 31 is provided as an example of a first portion, the trailing edge part 32 is provided as an example of a second portion, and a middle part 33 is provided as an example of a third part. Further, the upper surface 35 refers to a surface that coves an upper portion of the middle part 33, the lower surface 36 refers to a surface that covers a lower portion of the middle part 33, the first lateral surface 37 refers to a surface that covers a left portion when viewed from the upstream side of the flat blades 30, and the second lateral surface 38 refers to a surface that covers a right portion when viewed from the upstream side of the flat blades 30. The first lateral surface 37 and the second lateral surface 38 are fixed to the first lateral surface 17 and the second lateral surface 18 of the duct 10, respectively.

In this case, in FIG. 1, a height of a flow path between the flat blades 30 adjacent to each other (hereinafter, referred to as a "flow path length") is referred to as P, a length from a leading edge of the flat blade 30 to a trailing edge thereof (hereinafter, referred to as a "blade length") is referred to as L, a length of the trailing edge part 32 (hereinafter, referred to as a "trailing edge length") is referred to as Lt, and a slope angle of the trailing edge part 32 (hereinafter, referred to as a "slope angle of a trailing edge part") is referred to as θ. The flow path height P may refer to a distance between facing surfaces of the flat blades 30 adjacent to each other. The flow path height P includes a height of a flow path between the upper surface 15 of the duct 10 and the uppermost flat blade 30a and a height of a flow path between the lower surface 16 of the duct 10 and the undermost flat blade 30d. Further, the slope angle θ of the trailing edge part may refer to an angle between an upper side or a lower side of the cross section of the trailing edge part 32 and an airflow direction.

Further, in the first embodiment, an airflow generator 50 configured to generate airflow is disposed on a side of the upper surface 35 of the middle part 33. The airflow generators 50a to 50d generate airflow 39 from the upstream side parallel to the flat blades 30a to 30d toward the downstream side.

Figure 2:
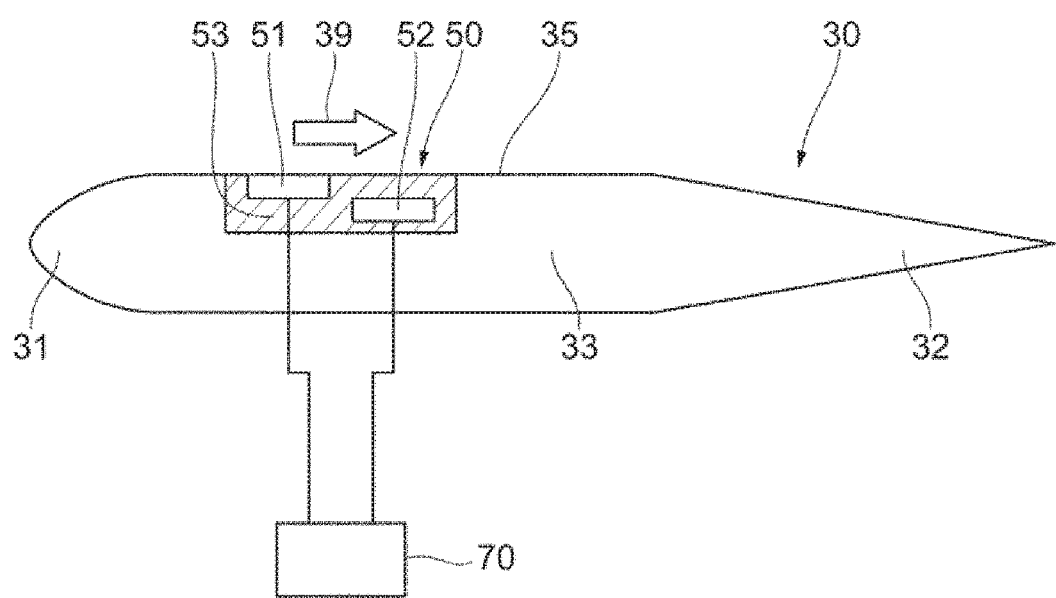
FIG. 2 is a view illustrating a configuration of an airflow generator and the like according to the first embodiment of the present disclosure.

FIG. 2 is a view illustrating a configuration of an airflow generator 50 and the like according to the first embodiment. As shown, the airflow generator 50 includes an upstream electrode 51, a downstream electrode 52, and a dielectric 53. In the embodiment, the upstream electrode 51 is provided as an example of a first electrode on an inlet side of the duct, and the downstream electrode 52 is provided as an example of a second electrode on an outlet side of the duct. Further, in the drawing, a power supply 70 configured to apply a voltage to the airflow generator 50 is shown. In this case, the drawing shows that the power supply 70 applies a voltage to one airflow generator 50 but may apply a voltage to an entirety of the airflow generators 50a to 50d. Otherwise, the power supply 70 may selectively apply a voltage to a part of the airflow generators 50a to 50d.

The upstream electrode 51 and the downstream electrode 52 are disposed to be spaced apart from each other with the dielectric 53 disposed therebetween in a direction from upstream to downstream. Further, the upstream electrode 51 is exposed on the upper surface 35 of the flat blades 30 or covered with a dielectric thin film and disposed on the upper surface 35 of the flat blades 30. Meanwhile, the downstream electrode 52 is embedded in the dielectric 53. In this case, the length in an airflow direction of the upstream electrode 51 may be shorter than a length in an airflow direction of the downstream electrode 52. Further, a photocatalyst or a thermal catalyst configured to adsorb and decompose ozone may be applied even to an inner surface which is closer to the outlet 12 than the airflow generator 50 of the duct 10. In this case, activated carbon is used as an ozone absorbing material at a thickness of several micrometers to several hundred micrometers, and manganese dioxide, nickel oxide, ferrous oxide, or the like may be used as an ozone decomposing material at a thickness of several micrometers to several hundred micrometers. The power supply 70 applies a voltage to between the upstream electrode 51 and the downstream electrode 52 so that discharge is performed, and body forces are generated due to collision of charged particles so that ambient air is introduced, and thus the airflow generator 50 generates the airflow 39 from the upstream side parallel to the flat blade 30 toward the downstream side. The power supply 70 may include an electric circuit configured to control electrical conduction so that a constant voltage is periodically applied to the upstream electrode 51.

That is, the airflow generator 50 generates the uniform airflow 39 without a driver.

In this case, the two or more airflow generators 50 are disposed in series to be spaced apart from each other in a direction from upstream toward downstream. Therefore, a pressure of the airflow 39 is further increased.

Further, a cross-sectional shape of the flat blade 30 when cut in a direction parallel to a direction from the upstream to the downstream and perpendicular to the flat blade 30 will be described with reference to FIG. 2.

The leading edge part 31 has a shape having a cross section in which a thickness decreases in an upstream direction. For example, the upstream side may have a convex cross-sectional shape. The drawing shows that the upstream side has a round cross-sectional shape, but the upstream side may have a sharp cross-sectional shape. Since the leading edge part 31 has such a cross-sectional shape, inflow resistance of the airflow 39 to the flow path between the flat blades 30 is decreased, and thus entry loss of the airflow 39 is decreased. Further, a width of the flow path between the flat blades 30 increases, and thus static pressure of the airflow 39 may increase.

The trailing edge part 32 has a cross-sectional shape in which a thickness decreases in a downstream direction. For example, the trailing edge part 32 may have a shape in which a thickness of the trailing edge part 32 continuously decreases in a direction toward the downstream side. The drawing shows that the downstream side has a sharp cross-sectional shape, but a front end on the downstream side may have a round shape. In the two flat blades 30 adjacent to each other, the trailing edge parts 32 of the two flat blades 30 may be disposed to have a flow path of which the width continuously increases in a direction toward the downstream side. Since the trailing edge part 32 has such a cross-sectional shape, separation of flow in the outlets of the flat blades 30a to 30d can be suppressed, and thus the outlet flow can be stabilized. Further, the width of the flow path between the flat blades 30 is increased, and a speed of the airflow 39, that is a dynamic pressure, is degraded, and thus static pressure can be increased.

The middle part 33 refers to a portion having a nearly uniform thickness between the leading edge part 31 and trailing edge part 32. As described above, the airflow generator 50 is disposed on a side of an upper surface 35 of the middle part 33.

Figure 3:
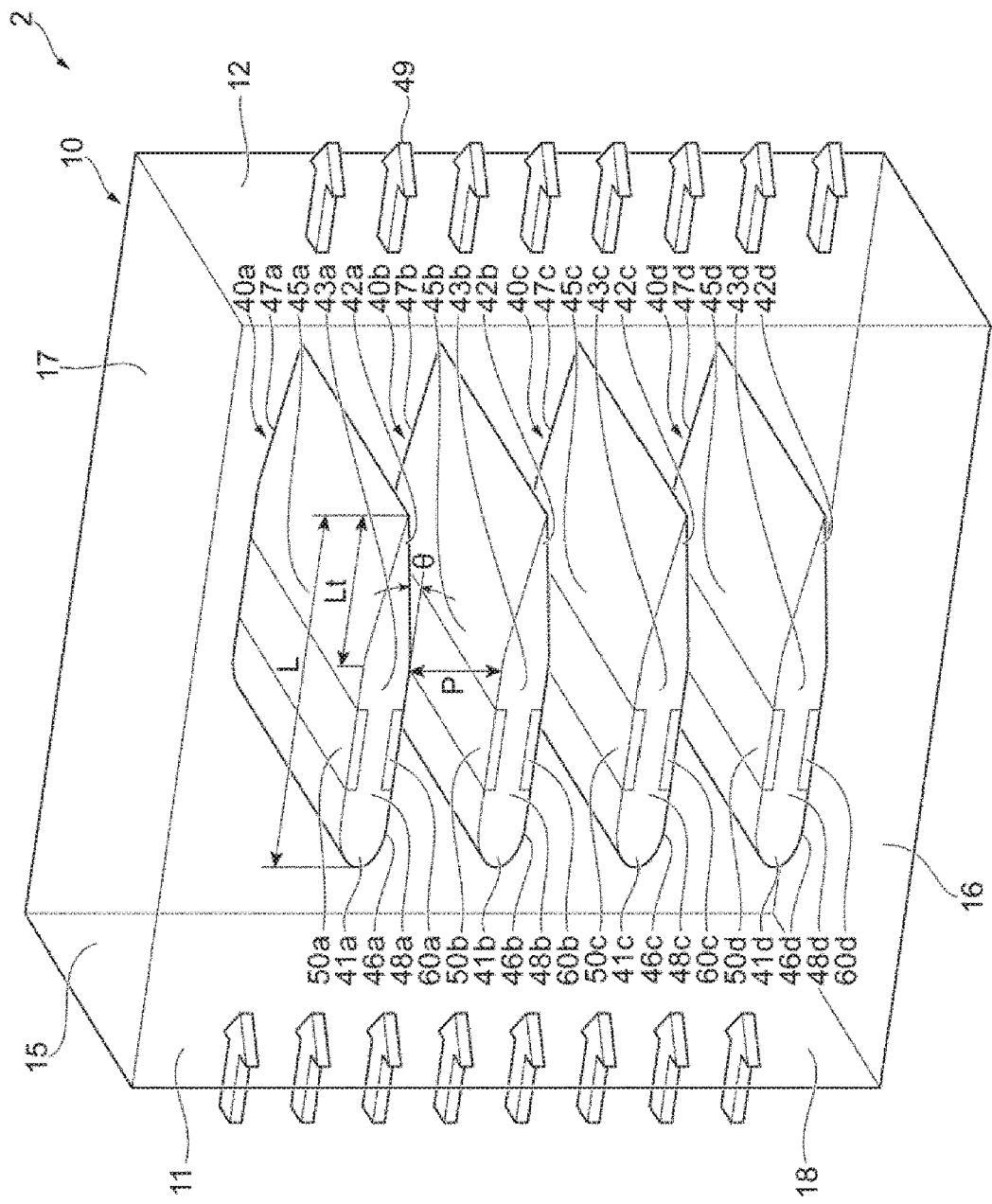
FIG. 3 is a view illustrating a configuration example of an entirety of a blower according to a second embodiment of the present disclosure.

FIG. 3 is a view illustrating a configuration example of an entirety of a blower 2 according to a second embodiment. As shown, the blower 2 according to the second embodiment includes a duct 10 and flat blades 40a to 40d.

The duct 10 is the same as the duct 10 in the first embodiment, and thus a description of the duct 10 will be omitted.

Like the flat blades 30a to 30d, the flat blades 40a to 40d refer to four flat blades which are disposed in the duct 10 to be nearly parallel to each other. The flat blades 40a to 40d have a uniform cross-sectional shape in a width direction (a direction in which a first lateral surface 17 is connected to a second lateral surface 18). In the drawing, the flat blades 40a to 40d are shown, and added letters such as a to d are added to symbols of components of the flat blades 40a to 40d, respectively. However, when it is not necessary to distinguish the components of the flat blades 40a to 40d, for example, the flat blades 40 may be described without the added letters. Further, in the drawing, the four flat blades 40 are shown, but two, three, or five or more flat blades 40 may be disposed.

The flat blade 40 includes a leading edge part 41, a trailing edge part 42, a middle part 43, an upper surface 45, a lower surface 46, a first lateral surface 47, and a second lateral surface 48. The leading edge part 41, the trailing edge part 42, the middle part 43, the upper surface 45, the lower surface 46, the first lateral surface 47, and the second lateral surface 48 are the same as the leading edge part 31, the trailing edge part 32, the middle part 33, the upper surface 35, the lower surface 36, the first lateral surface 37, and the second lateral surface 38 in the first embodiment, and thus a description thereof will be omitted.

In this case, like FIG. 1, a flow path height P, a blade length L, a trailing edge length Lt, and a slope angle θ of a trailing edge part are also shown in FIG. 3. Like FIG. 1, the flow path height P includes a height of a flow path between the upper surface 15 of the duct 10 and the uppermost flat blade 40a and a height of a flow path between a lower surface 16 of the duct 10 and the undermost flat blades 40d.

Further, in the second embodiment, the airflow generator 50 and the airflow generator 60 configured to generate airflow are disposed on the upper surface 45 and the lower surface 46, respectively, of the middle part 43. The airflow generators 50a to 50d and the airflow generators 60a to 60d generate airflow 49 from an upstream side parallel to the flat blades 40a to 40d to a downstream side. Like in the first embodiment, when the airflow generator 50 is installed only on the upper surface 45, loss of friction is generated on a lower surface 36 on which the airflow generator 50 is not installed, but the airflow generators 50 and 60 are disposed on the upper surface 45 and the lower surface 46, and thus loss of friction can be suppressed. Further, body forces are generated between the flat blades 40 in a direction parallel to the flat blades 40 from upper, lower, and both lateral directions. As a result, an air volume easily increases, and static pressure simultaneously increases. FIG. 3 shows that the number of arrows that represent the airflow 49 are greater than the number of arrows that represent the airflow 39 in FIG. 1.

Figure 4:
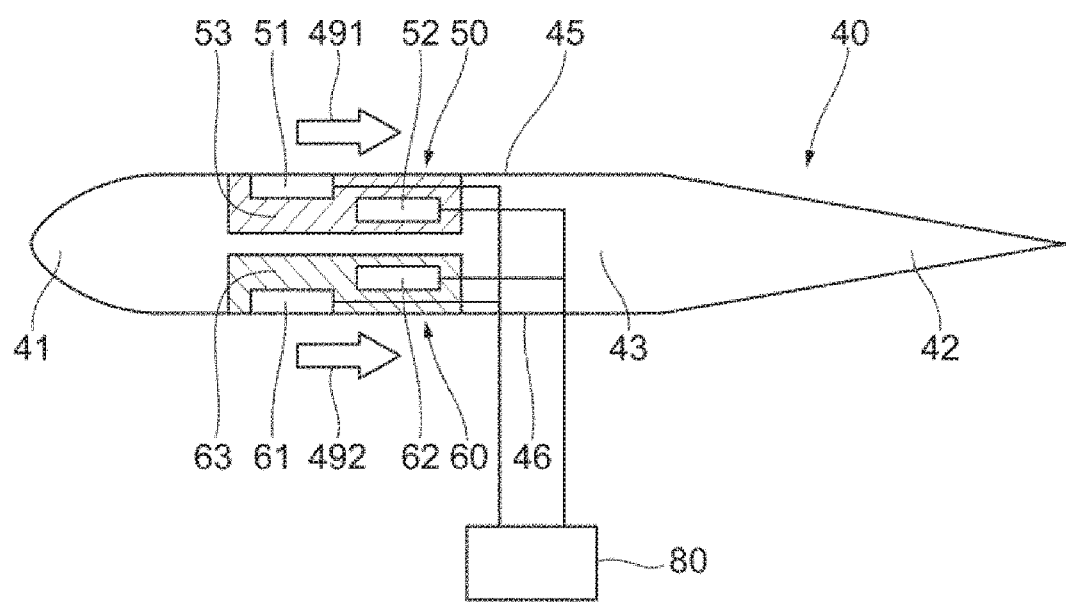
FIG. 4 is a view illustrating a configuration of an airflow generator and the like according to the second embodiment of the present disclosure.

FIG. 4 is a view illustrating a configuration of airflow generators 50 and 60 and the like according to the second embodiment. As shown, the airflow generator 50 includes an upstream electrode 51, a downstream electrode 52, and a dielectric 53, and the airflow generator 60 includes an upstream electrode 61, a downstream electrode 62, and a dielectric 63. In the embodiment, the upstream electrodes 51 and 61 are provided as an example of a first electrode on an inlet side of a duct, and the downstream electrodes 52 and 62 are provided as an example of a second electrode on an outlet side of the duct. Further, a power supply 80 configured to apply a voltage to the airflow generators 50 and 60 is shown in the drawing. In this case, the drawing shows that the power supply 80 applies a voltage to one group of the airflow generators 50 and 60 but may apply a voltage to all groups of the airflow generators 50a to 50d and 60a to 60d. Otherwise, the power supply 80 may selectively apply a voltage to a part of groups of the airflow generators 50a to 50d and 60a to 60d in FIG. 3.

Since the airflow generator 50 is the same as that in the first embodiment, a description thereof will be omitted. However, airflow which is generated by the airflow generator 50 and flows from an upstream side parallel to the flat blade 40 and a downstream side is shown as airflow 491.

Further, the airflow generator 60 has the same configuration as the airflow generator 50. That is, the airflow generator 60 includes the upstream electrode 61 and the downstream electrode 62 disposed to be spaced apart from each other with the dielectric 63 disposed therebetween. Further, the upstream electrode 61 is exposed on a lower surface 46 of the flat blade 40 or covered with a dielectric thin film and disposed on the lower surface 46 of the flat blade 40. Meanwhile, the downstream electrode 62 is embedded in the dielectric 63. In this case, a length in an airflow direction of the upstream electrode 61 may be shorter than a length in an airflow direction of the downstream electrode 62. Further, the upstream electrode 61 may have a wire shape. Further, a photocatalyst or a thermal catalyst that adsorbs and decomposes ozone may be applied to a surface of the trailing edge part 42 on the lower surface 46 on which the airflow generator 60 is provided. Further, a photocatalyst or a thermal catalyst that adsorbs and decomposes ozone may also be applied to an inner surface which is closer to an outlet 12 than the airflow generator 60 of the duct 10. In this case, activated carbon is used as an ozone absorbing material at a thickness of several micrometers to several hundred micrometers, and manganese dioxide, nickel oxide, ferrous oxide, or the like may be used as an ozone decomposing material at a thickness of several micrometers to several hundred micrometers. The power supply 80 applies a voltage between the upstream electrode 61 and the downstream electrode 62 so that discharge is performed, and body forces are generated due to collision of charged particles so that ambient air is introduced, and thus the airflow generator 60 generates airflow 492 from the upstream side parallel to the flat blade 40 toward the downstream side. The power supply 80 may include an electric circuit configured to control electric conduction so that a constant voltage is periodically applied to the upstream electrode 61.

That is, the airflow generators 50 and 60 generate the uniform airflows 491 and 492 without drivers.

In this case, the two or more airflow generators 60 are also disposed in series to be spaced apart in a direction from the upstream side to the downstream side. Therefore, a pressure of the airflow 492 is further increased.

A cross-sectional shape of the flat blade 40 when cut in a direction parallel to the direction from the upstream to the downstream and perpendicular to the flat blade 40 is the same as that of the flat blade 30 in the first embodiment, and thus a description thereof will be omitted.

Figure 5:
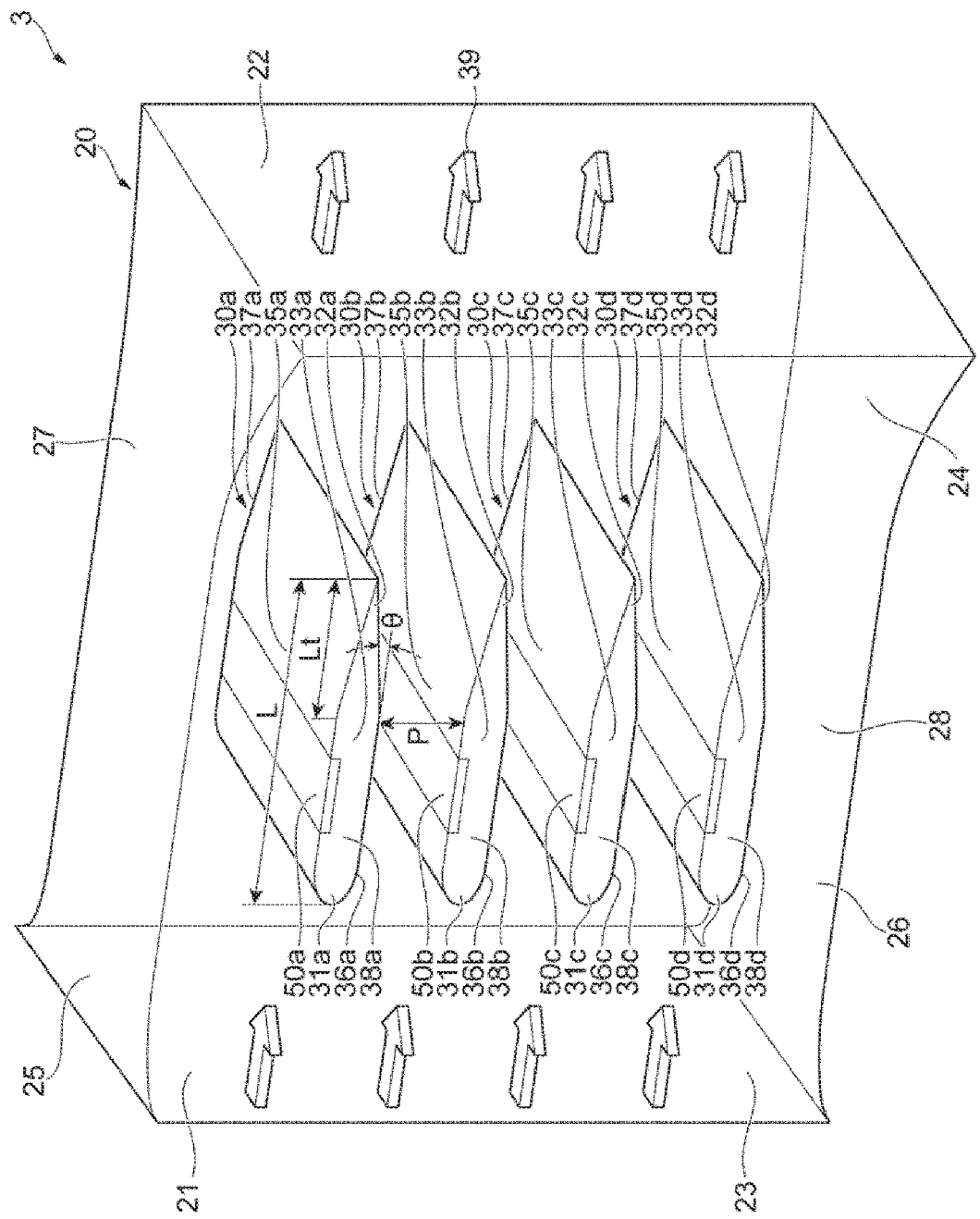
FIG. 5 is a view illustrating a configuration example of an entirety of a blower according to a third embodiment of the present disclosure.

FIG. 5 is a view illustrating a configuration example of an entirety of a blower 3 according to a third embodiment. As shown, the blower 3 according to the third embodiment includes a duct 20 and flat blades 30a to 30d.

The duct 20 includes an inlet 21, an outlet 22, an inlet part 23, an outlet part 24, an upper surface 25, a lower surface 26, a first lateral surface 27, and a second lateral surface 28.

The inlet 21 refers to an air inlet to the duct 20, and the outlet 22 refers to an air outlet from the duct 20. That is, the duct 20 functions as an air path from the inlet 21 toward the outlet 22. Hereinafter, a side of the inlet 21 refers to an upstream side, and a side of the outlet 22 refers to a downstream side.

The inlet part 23 refers to a portion that is in contact with the inlet 21 of the duct 20, and the outlet part 24 refers to a portion that is in contact with the outlet 22 of the duct 20. In the third embodiment, a cross-sectional shape of the inlet part 23 cut by a cross section perpendicular to a direction from upstream toward downstream increases in a direction toward the inlet 21. For example, the inlet part 23 may have a bell mouth shape. Therefore, entry loss of the duct 20 decreases, and thus blowing performance increases and noise simultaneously decreases. Further, a cross-sectional shape of the outlet part 24 cut by the inlet toward the cross section perpendicular to a direction from upstream to downstream increases in a direction toward the outlet 22. For example, a slope surface is formed so that a cross-sectional area of the outlet part 24 increases in a direction toward the outlet 22. Thus, a flow speed in the outlet decreases, and dynamic pressure is degraded, and thus static pressure easily increases.

The upper surface 25 refers to a surface that covers an upper portion of the duct 20, the lower surface 26 refers to a surface that covers a lower portion of the duct 20, the first lateral surface 27 refers to a surface that covers a left portion when viewed from the upstream side of the duct 20, and the second lateral surface 28 refers to a surface that covers a right portion when viewed from the upstream side of the duct 20. In the third embodiment, the upper surface 25 and the lower surface 26 are maintained as flat surfaces, and the first lateral surface 27 and the second lateral surface 28 are maintained as curved surfaces, and thus a cross section of the inlet part 23 perpendicular to the direction from upstream to downstream increases in a direction toward the inlet 21, and the cross section of the outlet part 24 perpendicular to the direction from upstream to downstream increases in a direction toward the outlet 22.

The flat blades 30a to 30d refer to four flat blades disposed in the duct 20 to be nearly parallel to each other. In this case, the flat blades 30a to 30d are shown in the drawing, and added letters such as a to d are attached to symbols of the components of the flat blades 30a to 30d. However, when it is not necessary to distinguish the flat blades 30a to 30d, for example, the flat blades 30 and the like may be shown without the added letters. Further, the four flat blades 30 are shown in the drawing, but two, three, or five or more flat blades 30 may be disposed.

The flat blades 30 are the same that in the first embodiment, and thus a description thereof will be omitted.

Further, in the third embodiment, to make the cross section of the inlet part 23 cut by the cross section perpendicular to the direction from upstream to downstream increase in a direction toward the inlet 21 and make the cross section of the outlet part 24 cut by the cross section perpendicular to the direction from upstream to downstream increase in a direction toward the outlet 22, the upper surface 25 and the lower surface 26 are formed as flat surfaces, and the first lateral surface 27 and the second lateral surface 28 are formed as curved surfaces, but the present disclosure is not limited thereto. Otherwise, an entirety of the upper surface 25, the lower surface 26, the first lateral surface 27, and the second lateral surface 28 may be formed as curved surfaces. Further, an appropriate method will be chosen from the above-described methods depending on a layout.

In the blowers 1 and 2 according to the first and second embodiments, the plurality of flat blades 30 and 40 are disposed in a rectangular parallelepiped duct 10 to be nearly parallel to each other, and in the blower 3 according to the third embodiment, the plurality of flat blades 30 are disposed to be nearly parallel to each other in the rectangular parallelepiped duct 20 having an entirety or part of curved surfaces, but the present disclosure is not limited thereto. That is, blades having nearly straight-shaped cross-sections when cut in a cross section perpendicular to a direction from upstream to downstream are disposed in a nearly rectangular parallelepiped, but the present disclosure is not limited thereto. As a modified example, a blower that has a plurality of circular blades with different outer diameters disposed in a cylindrical duct with a circular inlet and outlet is considered. In this case, the circular blade refers to a blade having a nearly circular shaped cross section when cut n the direction from upstream to downstream, but the present disclosure is not limited thereto.

Even in the blower according to the modified example, airflow generators are disposed on one surface or both surfaces of the circular blade, and a cross section of the circular blade when cut in a cross section parallel to the direction from upstream to downstream and passing through a center of the circular shape is the same as those of the first to third embodiments.

Further, file the first to third embodiments, a length between the circular blades adjacent to each other refers to a flow path height P, and a blade length L refers to a length of the circular blade in the direction from upstream to downstream. In this case, the flow path height P also includes a height of a flow path between an inner surface of the circular duct and a circular blade disposed outermost.

Figure 6:
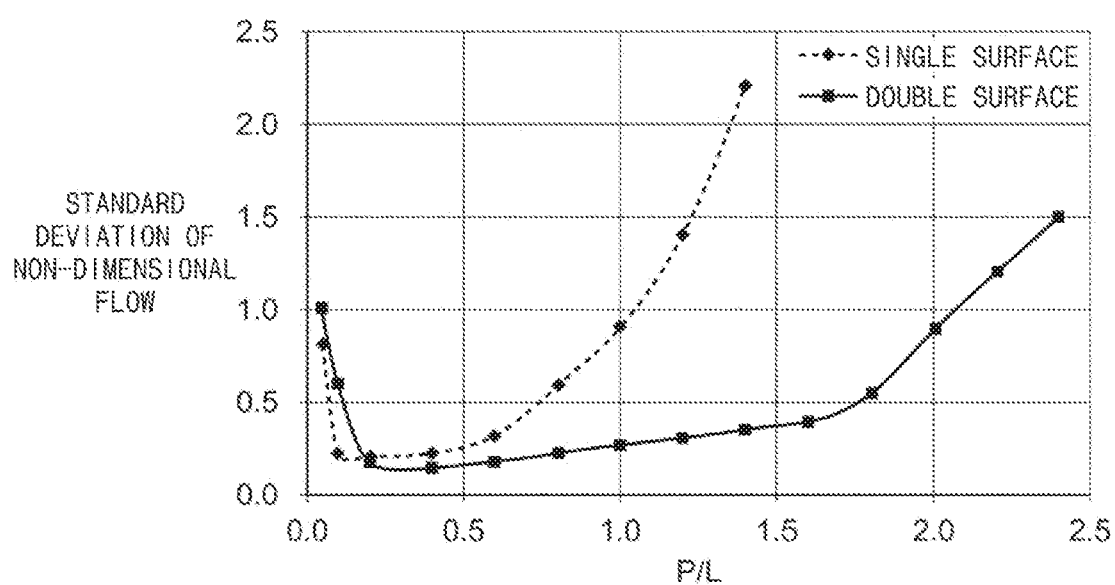
FIG. 6 is a graph illustrating a relationship between a standard deviation of a non-dimensional flow speed in an outlet of a flat blade and a ratio (P/L) of a flow path (P) to a blade length (L)

FIG. 6 is a graph illustrating a relationship between a standard deviation of a non-dimensional flow speed in an outlet of a flat blade and a ratio P/L of a flow path P to a blade length L. In the first to third embodiments, a non-dimensional flow speed in an outlet of the flat blade refers to a value obtained by dividing an airflow speed in the outlet of the flat blade 30 by an average flow speed in a cross section of the outlet of the flat blade 30. In the second embodiment, a non-dimensional flow speed in the outlet of the flat blade refers to a value obtained by dividing an airflow speed in the outlet of the flat blade 40 by an average flow speed in a cross section of the outlet of the flat blade 40.

When a deviation of the non-dimensional flow speed in the outlet of the flat blade is less than or equal to one, backflow does not occur between the flat blades. Therefore, to suppress backflow between the flat blades, the ratio P/L is adjusted to the following range. In other words, when the airflow generator is disposed only on a single surface, that is, when only the airflow generator 50 is disposed on the flat blade 30, P/L is less than or equal to 1. Further, when the airflow generators are disposed on both surfaces, that is, when the airflow generators 50 and 60 are disposed on the flat blade 40, the ratio P/L is less than or equal to two. Generally, when the number of surfaces, on which the airflow generators are disposed, of upper and lower surfaces of the flow path between the two flat blades or between the flat blade and an inner surface of the duct refers to N, the ratio P/L is less than or equal to N. Therefore, it is difficult for backflow to be generated between the flat blades, and thus static pressure easily increases.

Further, when the standard deviation of the non-dimensional flow speed in the outlet of the flat blades is less than or equal to 0.5, blowing can be performed more efficiently. Therefore, when the airflow generator is disposed only on a single surface, that is, when only the airflow generator 50 is disposed on the flat blade 30, the ratio P/L may be greater than or equal to 0.1 and less than or equal to 0.7. Further, when the airflow generators are disposed on both surfaces, that is, when the airflow generators 50 and 60 are disposed on the flat blade 40, the ratio P/L may be greater than or equal to 0.2 and less than or equal to 1.7.

A preferable range of the ratio P/L is the same as that of the circular blade according to the modified example.

Figure 7:
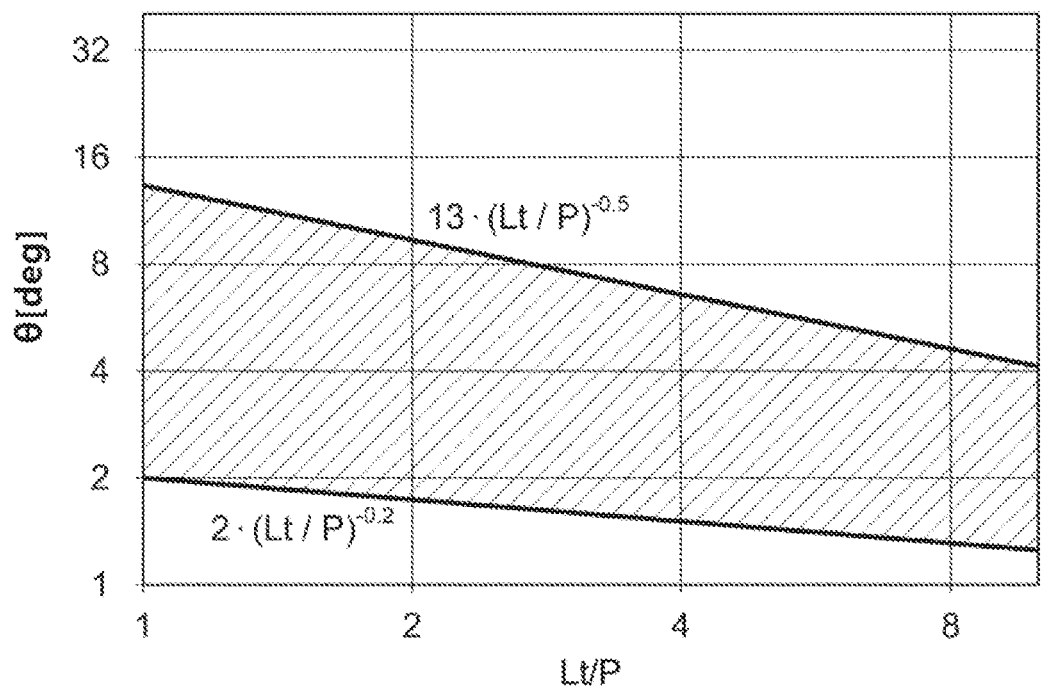
FIG. 7 is a graph illustrating a relationship between a ratio (Lt/P) of a length (Lt) of a trailing edge part to a height (P) of a flow path and a slope angle (θ) of the trailing edge part.

FIG. 7 is a graph illustrating a relationship between a ratio Lt/P of a length Lt of a trailing edge part to a height P of a flow path and a slope angle θ of the trailing edge part. When the relationship between the ratio Lt/P and the slope angle θ of the trailing edge part is in a hatched region of a graph, the outlet flow of the plurality of flat blades 30 is stabilized, and thus static pressure increases.

Specifically, first, the angle is obtained by $θ≤13×(Lt/P)^{-0.5}$ so that the flow is stabilized. As the length Lt of the trailing edge becomes longer, flow easily becomes unstable.

Further, while maintaining the relationship, a lower limit of θ is defined by $θ≥2×(Lt/P)-0.2$, and thus an increase in static pressure can be obtained effectively. Because separation of the outlet flow is suppressed, a flow width between the flat blades 30 increases.

In the above description, the slope angle θ of the trailing edge part refers to an angle between a straight line that connects a starting point on the upstream side of the trailing edge part 32 and a downstream end and the upper surface 35 or the lower surface 36 of the flat blade 30, but the present disclosure is not limited thereto.

Figure 8:
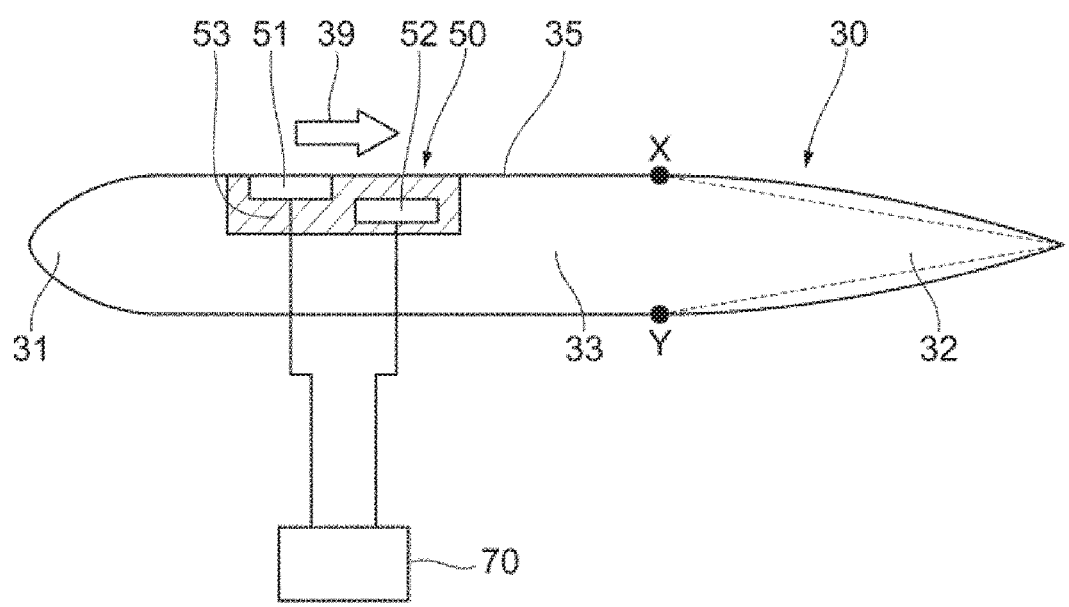
FIG. 8 is a view illustrating a modified example of a cross-sectional shape of a trailing edge part of a flat blade according to the first embodiment of the present disclosure.

FIG. 8 is a view illustrating a modified example of a cross-sectional shape of a trailing edge part 32 of a flat blade 30 according to the first embodiment. As shown, the slope angle θ of the trailing edge part is not stable, but the slope angle θ of the trailing edge part on the upstream side may be less than that on the downstream side. As a result, because a sharp change in flow angle at a starting point X or Y on the upstream side of the trailing edge part 32 decreases, flow can easily become more stable. For comparison, the cross-sectional shape of the trailing edge part 32 of the flat blade 30 shown in FIG. 2 is shown as a dotted line in the drawing.

The above descriptions are given based on the first embodiment but may be the same in the second and third embodiments.

Next, modified examples of cross-sectional shapes of flat blades 30 and 40 when cut in a cross section parallel to a direction from upstream to downstream and perpendicular to the flat blades 30 and 40 will be described.

Figure 9:
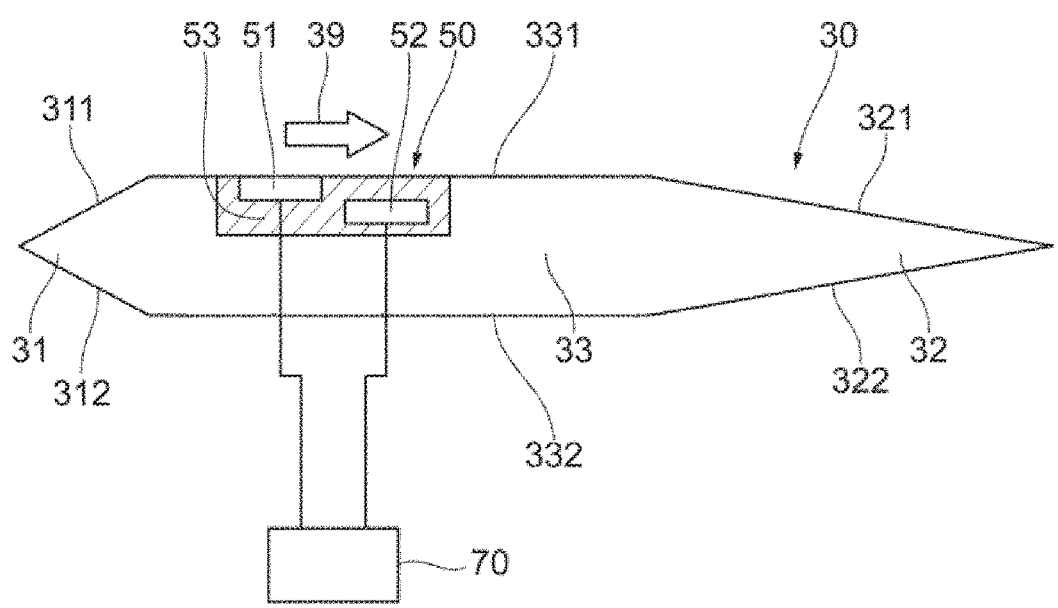
FIG. 9 is a view illustrating a modified example of a cross-sectional shape of a flat blade according to the first embodiment of the present disclosure.

FIG. 9 is a view illustrating a modified example of a cross-sectional shape of the flat blade 30 according to the first embodiment. In the modified example, as shown, a cross-sectional shape is a hexagon formed including six straight connected lines. That is, the flat blade 30 includes a leading edge part 31, a trailing edge part 32, and a middle part 33, and an entirety of an upper side 311 of the leading edge part 31, an upper side 331 of the middle part 33, an upper side 321 of the trailing edge part 32, a lower side 322 of the trailing edge part 32, a lower side 332 of the middle part 33, and a lower side 312 of the leading edge part 31 are straight lines and connected to each other in this sequential order to become a hexagon.

In this case, an example of the cross-sectional shape of the flat blade 30 as a hexagon formed by including six straight connected lines is shown, but the present disclosure is not limited thereto. More generally, the cross-sectional shape of the flat blade 30 may be a polygon formed by including a plurality of straight connected lines. For example, n straight lines on any one of the upper side 311 and the lower side 312 of the leading edge part 31 are connected, and a cross-sectional shape of the flat blade 30 may be a polygon having (2×n+4) sides. In this case, angles between the straight lines of the leading edge part 31 form an outward convex shape, and the upper side 311 and the lower side 312 of the leading edge part 31 may be vertically symmetrical to each other.

Other components are the same as those in FIG. 2. That is, as shown in the modified example, the airflow generator 50 is disposed in the middle part 33 and includes an upstream electrode 51, a downstream electrode 52, and a dielectric 53. Further, a power supply 70 applies a voltage between the upstream electrode 51 and the downstream electrode 52 so that discharge is performed, and body forces are generated due to collision of charged particles so that ambient air is introduced, and thus the airflow generator 50 generates airflow 39 from the upstream side parallel to the flat blade 30 toward the downstream side.

Further, in the modified example of the flat blade 30 shown in FIG. 2 or the flat blade 30 shown in FIG. 9, the upper side 331 and the lower side 332 of the middle part 33 on which the airflow generator 50 is disposed may be formed to be parallel to a main direction of air passing through the duct 10. In this case, for example, the upper surface 35 and the lower surface 36 of the middle part 33 shown in FIG. 1 are parallel to a main direction of air passing through the duct 10. Meanwhile, the upper side 311 and the lower side 312 of the leading edge part 31 and the upper side 321 and the lower side of the trailing edge part 32 may not be parallel to the main direction of the air passing through the duct 10. In this case, for example, the upper surface 35 and the lower surface 36 of the leading edge part 31 and the upper surface 35 and the lower surface 36 of the trailing edge part 32 shown in FIG. 1 are not parallel to the main direction of the air passing through the duct 10.

The above descriptions are given based on the first embodiment but may be the same as in the third embodiment.

Figure 10:
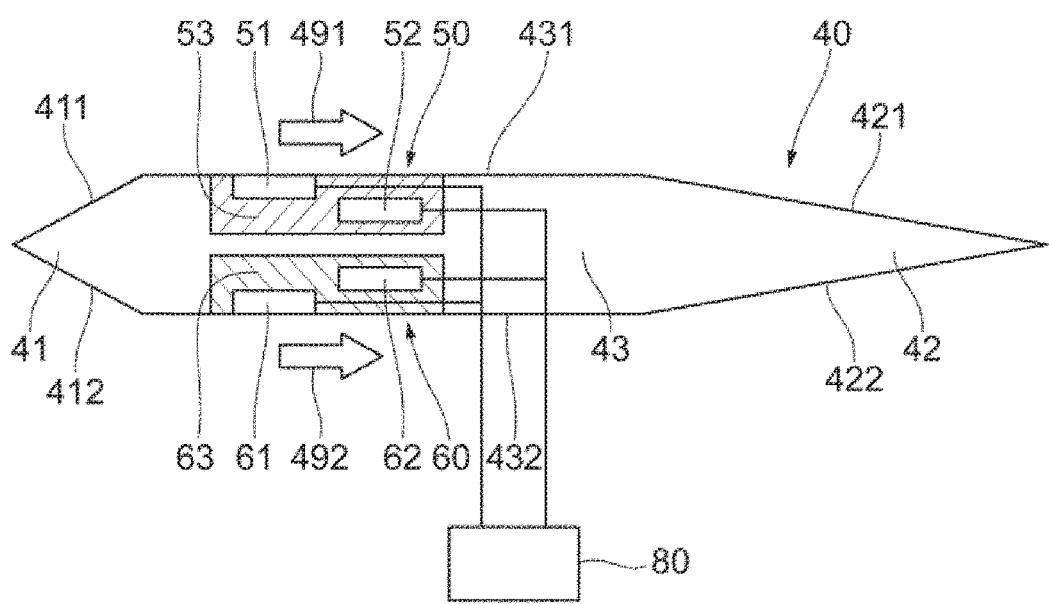
FIG. 10 is a view illustrating a modified example of a cross-sectional shape of a flat blade according to the second embodiment of the present disclosure.

FIG. 10 is a view illustrating a modified example of a cross-sectional shape of the flat blade 40 according to the second embodiment. As shown even in the modified example, a cross-sectional shape of the flat blade 40 is a hexagon formed by including six straight connected lines. That is, the flat blade 40 includes a leading edge part 41, a trailing edge part 42 and a middle part 43, and an upper side 411 of the leading edge part 41, an upper side 431 of the middle part 43, an upper side 421 of the trailing edge part 42, a lower side 422 of the trailing edge part 42, a lower side 432 of the middle part 43, and a lower side 412 of the leading edge part 41 are straight lines and connected in this sequential order to become a hexagon.

In this case, an example of a cross-sectional shape of the flat blades 40 is a hexagon formed by including six straight connected lines is shown, but the present disclosure is not limited thereto. More generally, the cross-sectional shape of the flat blades 40 may be a polygon formed by including a plurality of connected lines. For example, n straight lines on any one of an upper side 411 and a lower side 412 of the leading edge part 41 are connected, and a cross-sectional shape of the flat blade 40 may be a polygon having (2×n+4) sides. In this case, edges between the straight lines of the leading edge part 41 form an outward convex shape, and the upper side 411 and the lower side 412 of the leading edge part 41 may be vertically symmetrical to each other.

Other components are the same as those in FIG. 4. That is, as shown even in the modified example, the airflow generators 50 and 60 are disposed in the middle part 43, the airflow generator 50 includes an upstream electrode 51, a downstream electrode 52, and a dielectric 53, and the airflow generator 60 includes an upstream electrode 61, a downstream electrode 62, and a dielectric 63. Further, a power supply 80 applies a voltage between the upstream electrode 51 and the downstream electrode 52 so that discharge is performed, and body forces are generated due to collision of charged particles so that ambient air is introduced, and thus the airflow generators 50 and 60 generate airflow 491 from the upstream side parallel to the flat blade 40 toward the downstream side.

Further, in the modified example of the flat blade 40 shown in FIG. 4 or the flat blade 40 shown in FIG. 10, the upper side 431 and the lower side 432 of the middle part 43 on which the airflow generators 50 and 60 are disposed may be formed to be parallel to a main direction of air passing through the duct 10. In this case, for example, the upper surface 45 and the lower surface 46 of the middle part 43 shown in FIG. 3 are parallel to a main direction of the air passing through the duct 10. Meanwhile, the upper side 411 and the lower side 412 of the leading edge part 41 and the upper side 421 and the lower side 422 of the trailing edge part 42 may not be parallel to the main direction of the air passing through the duct 10. In this case, for example, the upper surface 45 and the lower surface 46 of the leading edge part 41 and the upper surface 45 and the lower surface 46 of the trailing edge part 42 shown in FIG. 3 are not parallel to the main direction of the air passing through the duct 10.

Figure 11:
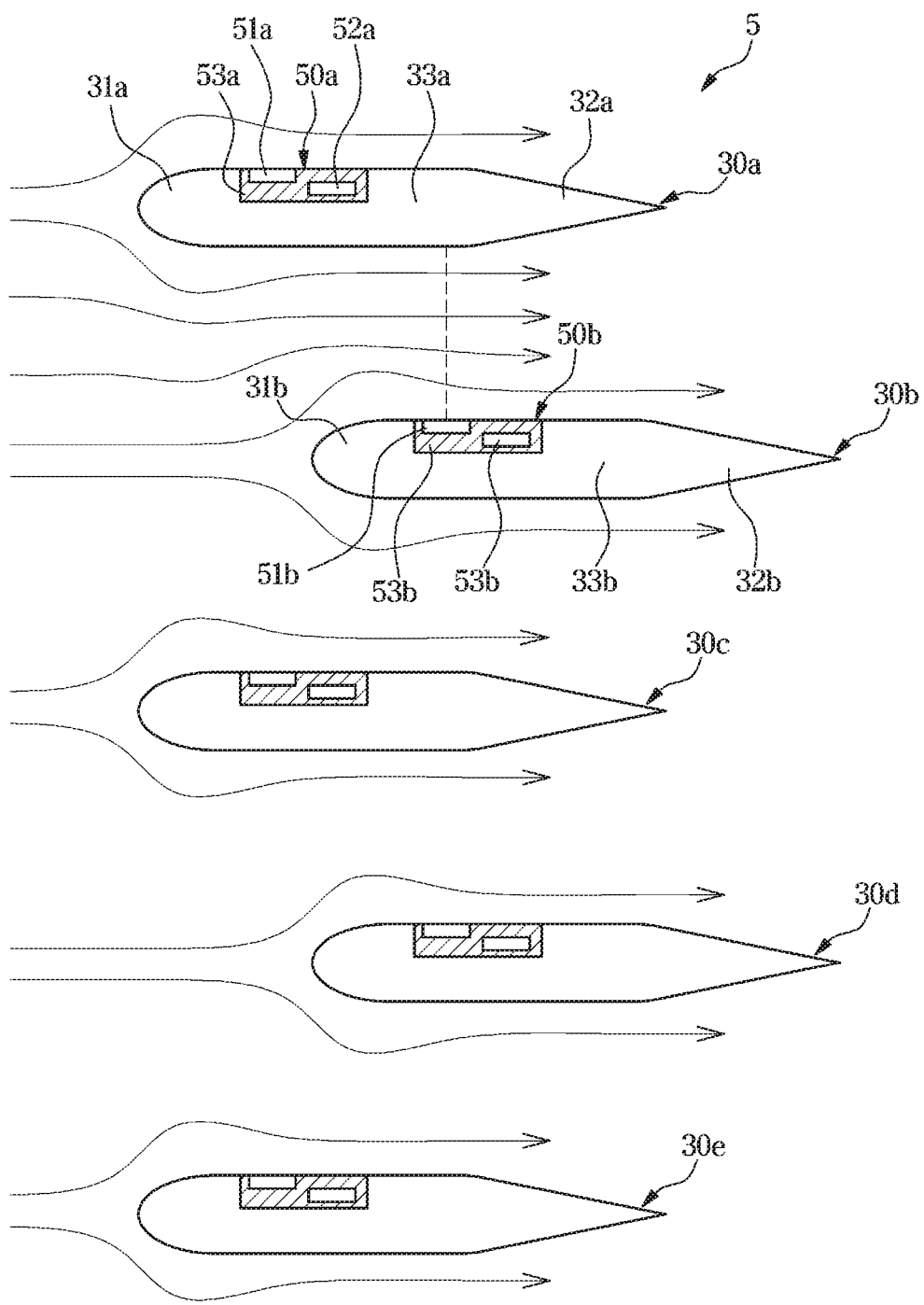
FIG. 11 is a view illustrating a configuration example of an entirety of a blower according to a fourth embodiment of the present disclosure.

FIG. 11 is a view illustrating a configuration example of an entirety of a blower 5 according to a fourth embodiment. The blower 5 according to the fourth embodiment has similar components to the blower 1 in the first embodiment but has a plurality of flat blades 30a to 30e arranged differently from those in the first embodiment. The same components as those in the above-described first embodiment may be denoted by the same reference numerals and descriptions thereof may be omitted.

The blower 5 according to the fourth embodiment includes the duct and the flat blades 30a to 30e.

The flat blades 30a to 30e are five flat blades disposed in the duct 10 to be parallel to each other. In the drawings, the flat blades 30a to 30d are shown, and added letters such as a to d are added to symbols of components of the flat blades 30a to 30e, respectively. However, when it is necessary to distinguish the components of the flat blades 30a to 30e, for example, the flat blades 30 may be described without the added letters. Further, in the drawings, the five flat blades 30 are shown, but two, three, four, or six or more flat blades 30 may be disposed.

The plurality of flat blades 30a to 30e may include a first flat blade 30a, a second flat blade 30b, a third flat blade 30c, a fourth flat blade 30d, and a fifth flat blade 30e in sequential order from top to bottom.

In the first embodiment, the plurality of flat blades are arranged in parallel in a vertical direction, but the plurality of flat blades 30a to 30e in the fourth embodiment may be arranged in a zigzag form in a vertical direction.

That is, the second flat blade 30b adjacently disposed under the first flat blade 30a may be disposed downstream from the first flat blade 30a. Further, the third flat blade 30c adjacently disposed under the second flat blade 30b may be disposed upstream from the second flat blade 30b. The third flat blade 30c may be disposed to be collinear with the first flat blade 30a in the vertical direction. The fourth flat blade 30d and the fifth flat blade 30e are also arranged in a zigzag form in this manner.

Therefore, since a plurality of flat blades 30a to 30e are arranged in a zigzag form in a vertical direction, an increase in flow resistance due to flow concentrated on a vicinity of an inlet can be suppressed.

When the plurality of flat blades 30a to 30e are arranged in the zigzag form in the vertical direction, an upstream electrode of a flat blade disposed downstream from any one of the flat blades may face a middle part of any one of the flat blades.

That is, the first flat blade 30a includes a leading edge part 31a, a trailing edge part 32a, and a middle part 33a, and the airflow generator 50a including an upstream electrode 51a, a downstream electrode 52a, and a dielectric 53a may be provided in the middle part 33a. The second flat blade 30b includes a leading edge part 31b, a trailing edge part 32b, and a middle part 33b, and the airflow generator 50b including an upstream electrode 51b, a downstream electrode 52b, and a dielectric 53b may be provided in the middle part 33b.

In this case, the upstream electrode 51b of the second flat blade 30b disposed downstream from the first flat blade 30a may be disposed to face the middle part 33a of the first flat blade 30a. Therefore, since the upstream electrode 51b of the second flat blade 30b configured to generate airflow faces the middle part 33a of the first flat blade 30a adjacent thereto, blowing performance at a level of the above-described first embodiment can be obtained.

Figure 12:
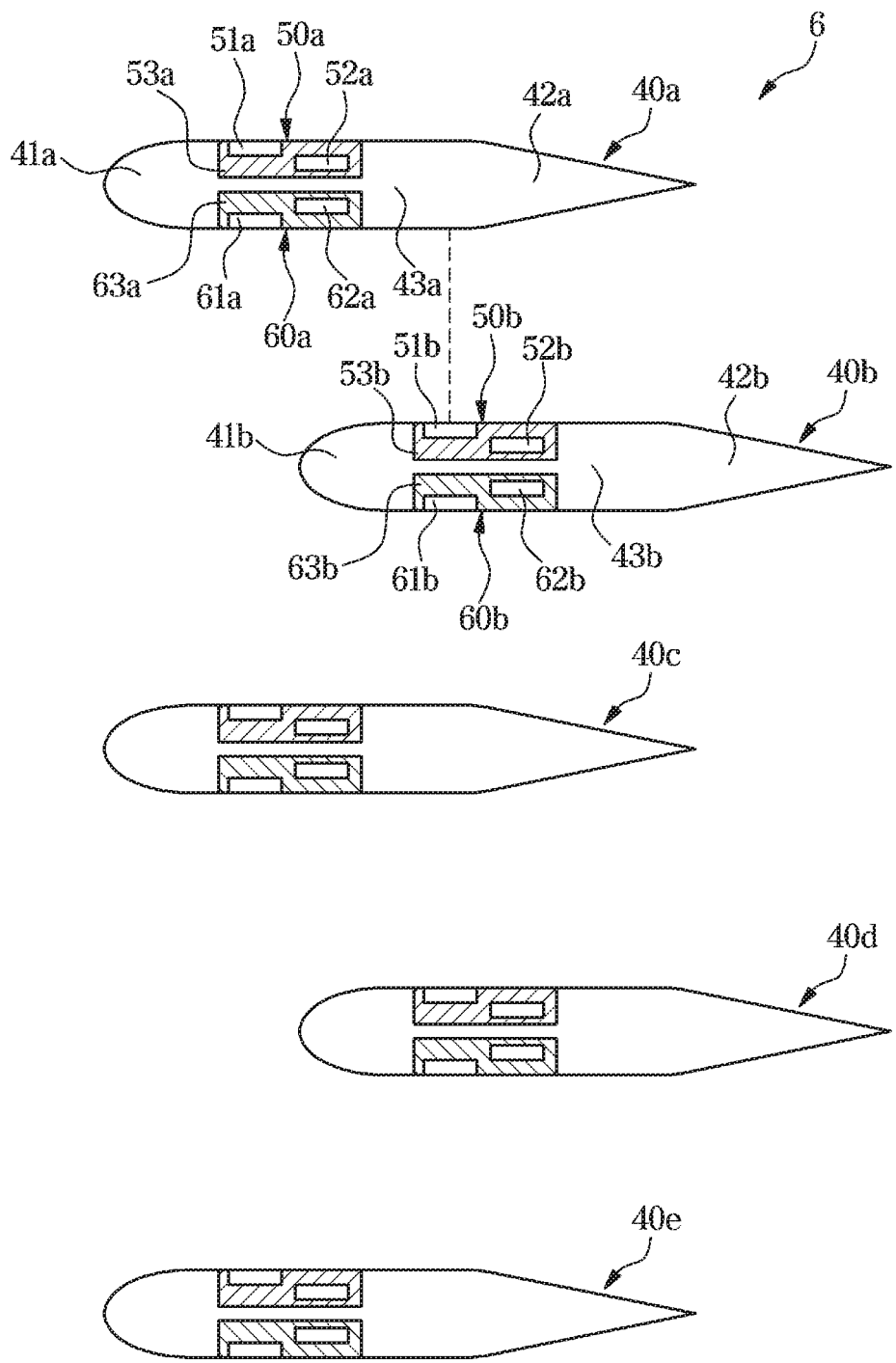
FIG. 12 is a view illustrating a configuration example of an entirety of a blower according to a fifth embodiment of the present disclosure.

FIG. 12 is a view illustrating a configuration example of an entirety of a blower 6 according to a fifth embodiment. The blower 6 according to the fifth embodiment has similar components to the blower 2 of the second embodiment but has a plurality of flat blades 40a to 40e arranged differently from those of the second embodiment. The same components as those in the above-described first embodiment may be denoted by the same reference numerals and descriptions thereof may be omitted.

The blower 6 according to the fifth embodiment includes a duct and the flat blades 40a to 40e.

The flat blades 40a to 40e are five flat blades disposed in the duct to be nearly parallel to each other. In the drawing, the flat blades 40a to 40e are shown, and added letters such as a to e are added to symbols of components of the flat blades 40a to 40e, respectively. However, when it is necessary to distinguish the components of the flat blades 40a to 40e, for example, the flat blades 40 may be described without the added letters. Further, in the drawing, the five flat blades 40 are shown, but two, three, four, or six or more flat blades 40 may be disposed.

The plurality of flat blades 40a to 40e may include a first flat blade 40a, a second flat blade 40b, a third flat blade 40c, a fourth flat blade 40d, and a fifth flat blade 40e in sequential order from top to bottom.

In the above-described second embodiment, the plurality of flat blades are arranged in parallel in a vertical direction, but the plurality of flat blades 40a to 40e in the fifth embodiment may be arranged in a zigzag form in a vertical direction.

That is, the second flat blade 40b adjacently disposed under the first flat blade 40a may be disposed downstream from the first flat blade 40a. Further, the third flat blade 40c adjacently disposed under the second flat blade 40b may be disposed upstream from the second flat blade 40b. The third flat blade 40c may be disposed to be collinear with the first flat blade 40a in the vertical direction. The fourth flat blade 40d and the fifth flat blade 40e are also arranged in a zigzag form in this manner.

Therefore, since the plurality of flat blades 40a to 40e are arranged in a zigzag form in a vertical direction, an increase in flow resistance due to flow concentrated on a vicinity of an inlet may be suppressed.

The first flat blade 40a may include a leading edge part 41a, a trailing edge part 42a, and a middle part 43a, and the second flat blade 40b may include a leading edge part 41b, a trailing edge part 42b, and a middle part 43b.

An airflow generator 50a and an airflow generator 60a configured to generate airflow may be disposed on an upper surface and a lower surface of the middle part 43a, respectively. The airflow generator 50a includes an upstream electrode 51a, a downstream electrode 52a, and a dielectric 53a, and the airflow generator 60a includes an upstream electrode 61a, a downstream electrode 62a, and a dielectric 63a.

The airflow generator 50b and the airflow generator 60b configured to generate airflow may be disposed on an upper surface and a lower surface of the middle part 43b, respectively. The airflow generator 50b includes an upstream electrode 51b, a downstream electrode 52b, and a dielectric 53b, and the airflow generator 60b includes an upstream electrode 61b, a downstream electrode 62b, and a dielectric 63b.

When the plurality of flat blades 40a to 40e are arranged in the zigzag form in the vertical direction, an upstream electrode of a flat blade disposed downstream from any one of the flat blades may face the middle part of any one of the flat blades.

That is, the upstream electrode 51b of the second flat blade 40b disposed downstream from the first flat blade 40a may be disposed to face the middle part 43a of the first flat blade 40a. Therefore, since the upstream electrode 51b of the second flat blade 40b configured to generate airflow faces the middle part 43a of the first flat blade 40a adjacent thereto, blowing performance at a level of the second embodiment can be obtained.

Figure 13:
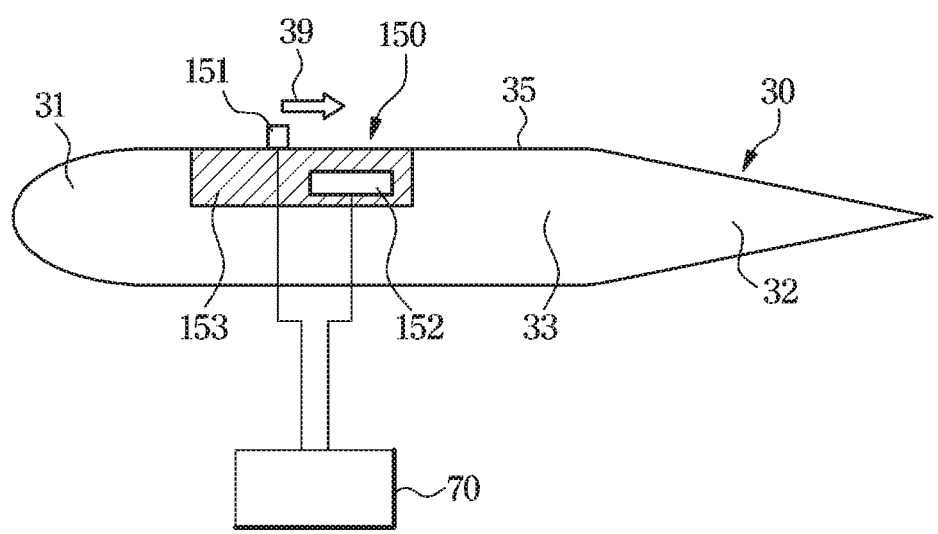
FIG. 13 is a view illustrating a modified example of the airflow generator according to the first embodiment of the present disclosure.

FIG. 13 is a view illustrating a modified example of the airflow generator according to the first embodiment. The same components as those in the above-described first embodiment may be denoted by the same reference numerals and descriptions thereof may be omitted.

The airflow generator 150 includes an upstream electrode 151, a downstream electrode 152, and a dielectric 153. The upstream electrode 151 and the downstream electrode 152 are disposed to be spaced apart from each other with the dielectric 153 disposed therebetween in a direction from upstream to downstream. Further, the upstream electrode 151 is exposed on the upper surface 35 of the flat blades 30 or covered with a dielectric thin film and disposed on the upper surface 35 of the flat blades 30. Meanwhile, the downstream electrode 152 is embedded in the dielectric 153. In this case, a length in an airflow direction of the upstream electrode 151 may be shorter than a length in an airflow direction of the downstream electrode 152.

Thus, since the length of the airflow direction of the upstream electrode 151 is shorter than the length of the airflow direction of the downstream electrode 152, discharge is performed from an entire vicinity of the upstream electrode 151, and a speed of induced airflow can be increased. Therefore, a required applied voltage can be decreased to obtain the same speed of airflow, and the amount of generated ozone can be decreased.

Figure 14:
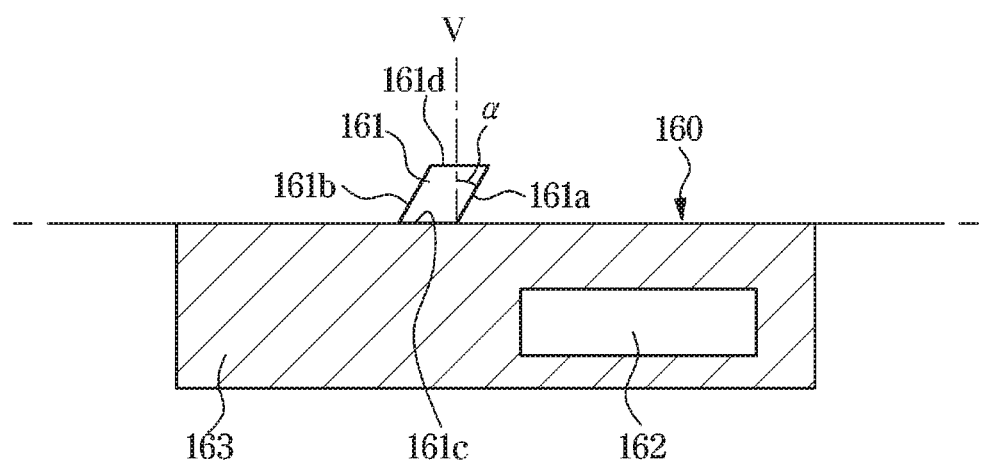
FIG. 14 is a view illustrating another modified example of the airflow generator according to the first embodiment of the present disclosure.
Figure 15:
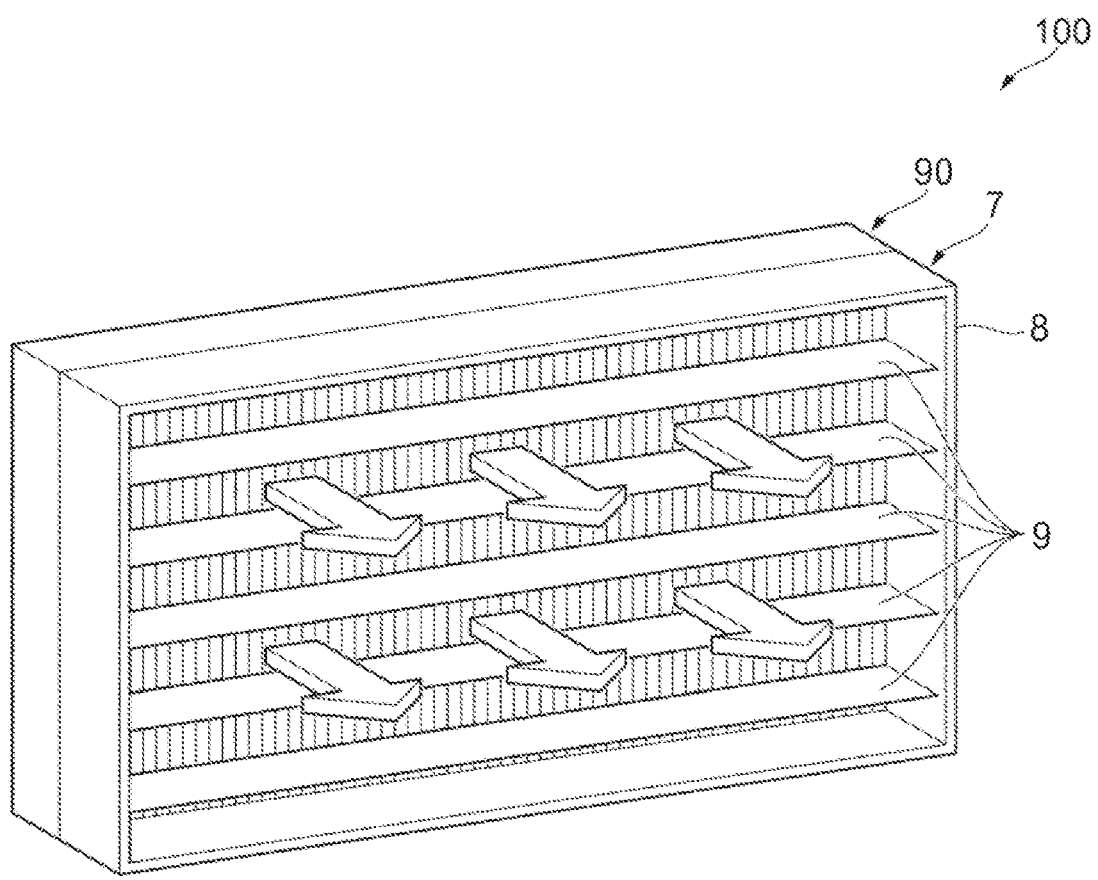
FIG. 15 is a view illustrating a configuration example of an entirety of an air conditioner according to one embodiment of the present disclosure.

FIG. 14 is a view illustrating another modified example of the airflow generator according to the first embodiment. The same components as those in the above-described first embodiment may be denoted by the same reference numerals and descriptions thereof may be omitted.

The airflow generator 160 includes an upstream electrode 161, a downstream electrode 162, and a dielectric 163. The upstream electrode 161 and the downstream electrode 162 are disposed to be spaced apart from each other with the dielectric 163 disposed therebetween in a direction from upstream to downstream. Further, the upstream electrode 161 may be exposed on an upper surface of the flat blade. The downstream electrode 162 is embedded in the dielectric 163.

The upstream electrode 161 includes an electrode-rear surface 161a on the downstream side, an electrode-front surface 161b on the upstream side, an electrode-bottom surface 161c that is in contact with the flat blade, and an electrode-upper surface 161d that is opposite to the electrode-bottom surface 161c.

The electrode-rear surface 161a may be formed to be inclined toward the downstream electrode 162. That is, the electrode-rear surface 161a may be formed to be inclined from a vertical line V by a predetermined angle α. Thus, since the electrode-rear surface 161a of the upstream electrode 161 is formed to be inclined toward the downstream electrode 162, the electrode-rear surface 161a of the upstream electrode 161 may become close to the downstream electrode 162, and a speed of organic airflow may increase. Therefore, a required applied voltage can decrease to obtain the same airflow speed and can decrease the amount of generated ozone.

FIG. 11 is a view illustrating a configuration example of an entirety of an air conditioner 100 according to one embodiment. A shown, the air conditioner 100 includes a blower and a heat exchanger 90.

The blower 7 may be one of the blower 1 according to the first embodiment, the blower 2 according to the second embodiment, the blower 3 according to the third embodiment, the blower according to the modified example, the blower 5 according to the fourth embodiment, and the blower 6 according to the fifth embodiment.

As components of the blower 7, the duct 20 and the flat blades 9 are shown. In this case, the ducts of the above-described embodiments have a rectangular parallelepiped shape which is vertically long, but in the drawing, the duct 20 has a rectangular parallelepiped shape which is laterally long. Therefore, the flat blade 9 is longer than the flat blades of the above-described embodiments in a width direction.

The heat exchanger 90 refers to a device configured to perform heat-exchange between a refrigerant and air in which airflow is generated by the blower 7. Specifically, when the air has a higher temperature than the refrigerant, heat is moved from the air to the refrigerant, and when the refrigerant has a higher temperature than the air, heat is moved from the refrigerant to the air.

Further, although a case in which the blower 7 according to the embodiment is applied to the air conditioner 100 is shown in FIG. 11, the blower 7 according to the embodiment may be applied to an air cleaning unit. In this case, the air cleaning unit includes an air cleaning filter instead of the heat exchanger 90 in FIG. 11.

As is apparent the above, a cross section of a leading edge part of each of a plurality of blades has a round or sharp shape, a cross section of a trailing edge part has a shape in which a thickness gradually decreases in a direction toward the trailing edge, and an airflow generator is disposed on a portion having an uniform thickness between the leading edge part and the trailing edge part. As a result, entry loss of airflow can decrease, separation of outlet flow can be suppressed, and an increase in static pressure due to an increase in width of a flow path can be easily generated when compared with a case in which various airflow generators are just disposed in a stacked manner.

Although the present disclosure has been described with various embodiments, various changes and modifications may be suggested to one skilled in the art. It is intended that the present disclosure encompass such changes and modifications as fall within the scope of the appended claims.

What is claimed is:

1. An air conditioner comprising:
    a heat exchanger; and
    a blower configured to blow air to exchange heat through the heat exchanger, the blower including:
        a duct including an inlet and an outlet, and
        a plurality of blades arranged in the duct, the plurality of blades spaced a regular distance from each other in a vertical direction, each of the plurality of blades including:
            a first part having a thickness decreasing in a direction toward the inlet,
            a second part having a thickness decreasing in a direction toward the outlet, and
            a third part formed between the first part and the second part, the third part including an airflow generator,
            wherein the airflow generator includes:
                a first electrode,
                a second electrode, and
                a dielectric,
            wherein the airflow generator generates airflow in a direction from the inlet to the outlet when a voltage is applied between the first electrode and the second electrode,
        wherein the plurality of blades are arranged in a zigzag form in a vertical direction,
        wherein the plurality of blades includes a first blade and a second blade, the second blade disposed downstream from the first blade, and
        wherein the first electrode of the second blade faces the third part of the first blade.

2. The air conditioner of claim 1, wherein an upper surface and a lower surface of the third part are parallel to a main direction of the airflow generated by the airflow generator.

3. The air conditioner of claim 2, wherein the upper surface and the lower surface of the third part are formed as flat surfaces.

4. The air conditioner of claim 2, wherein each of the plurality of blades includes a plurality of airflow generators, wherein the plurality of airflow generators are disposed on one surface and another surface of the third part.

5. The air conditioner of claim 1, wherein an upstream side of the first part has a round or sharp shape.

6. The air conditioner of claim 1, wherein a downstream side of the second part has a round or sharp shape.

7. The air conditioner of claim 1, wherein each of the plurality of blades includes a catalyst applied to one surface of the second part, the catalyst configured to adsorb and decompose ozone.

8. The air conditioner of claim 1, wherein the duct further includes an inlet part formed to be in contact with the inlet, the inlet part configured to guide air suctioned into the duct through the inlet,
    wherein the inlet part has a cross-sectional area increasing in a direction toward the inlet.

9. The air conditioner of claim 1, wherein the duct further includes an outlet part formed to be in contact with the outlet, the outlet part configured to guide the airflow generated by the airflow generator to the outlet,
    wherein the outlet part has a cross-sectional area increasing in a direction toward the outlet.

10. The air conditioner of claim 1, wherein the duct includes a catalyst applied to an inner surface of the duct that is closer to the outlet than the airflow generator, the catalyst configured to adsorb and decompose ozone.

11. The air conditioner of claim 1, wherein a length of the first electrode in an airflow direction is shorter than a length of the second electrode in the airflow direction.

12. The air conditioner of claim 1, wherein the first electrode includes an electrode-front surface facing the inlet and an electrode-rear surface facing the outlet,
    wherein the electrode-rear surface of the first electrode is inclined toward the second electrode.

13. A blower comprising:
    a duct, the duct including an inlet and an outlet; and
    a plurality of blades arranged in the duct, the plurality of blades spaced a regular distance from each other in a vertical direction, each of the plurality of blades including:
        a first part having a thickness decreasing in a direction toward the inlet,
        a second part having a thickness decreasing in a direction toward the outlet, and
        a third part formed between the first part and the second part, the third part including an airflow generator,
        wherein the airflow generator includes:
            a first electrode,
            a second electrode, and
            a dielectric,
        wherein the airflow generator generates airflow in a direction from the inlet to the outlet when a voltage is applied between the first electrode and the second electrode,
    wherein the plurality of blades are arranged in a zigzag form in a vertical direction, wherein the plurality of blades includes a first blade and a second blade, the second blade disposed downstream from the first blade, and wherein the first electrode of the second blade faces the third part of the first blade.

14. The blower of claim 13, wherein an upper surface and a lower surface of the third part are parallel to a main direction of the airflow generated by the airflow generator.

15. The blower of claim 13, wherein an upper surface and a lower surface of the third part are formed as a flat surface.

16. The blower of claim 13, wherein an upstream side of the first part has a round or sharp shape.

17. The blower of claim 13, wherein a downstream side of the second part has a round or sharp shape.

* * * * *